United States Patent Office 3,796,692
Patented Mar. 12, 1974

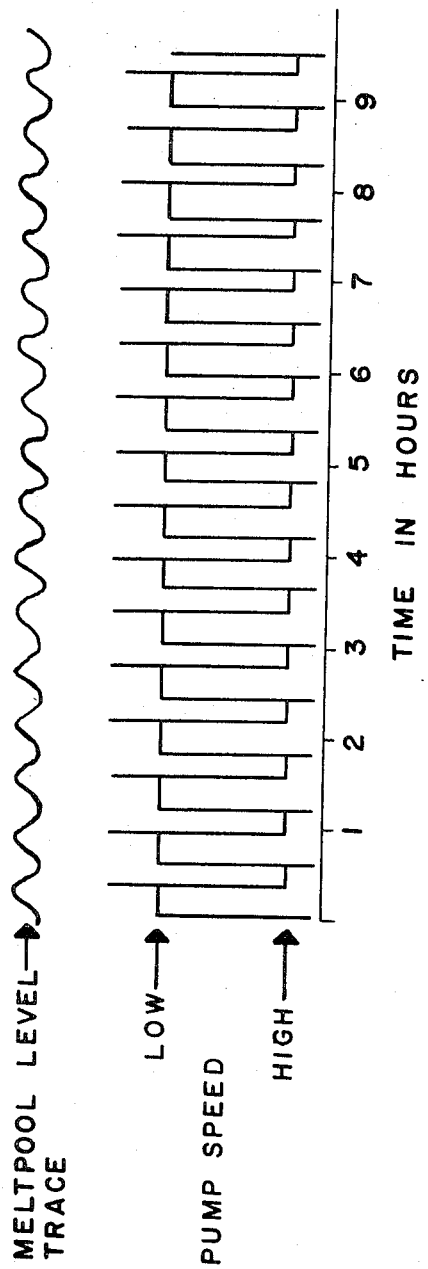

3,796,692
POLYAMIDE POLYMERIZATION CONTROL
Ronald J. Foltz, Taylors, and Bruce W. Portus, Greenville, S.C., assignors to Fiber Industries, Inc., Charlotte, N.C.
Continuation-in-part of abandoned application Ser. No. 860,321, Sept. 23, 1969. This application July 12, 1971, Ser. No. 161,180
Int. Cl. C08g 20/20
U.S. Cl. 260—78 R          8 Claims

ABSTRACT OF THE DISCLOSURE

A method and apparatus for controlling polyamide continuous polymerization to obtain substantially constant polymer properties, particularly as measured by amine end groups, carboxy end groups and relative viscosity. Substantially constant polymer properties are obtained even with changes in the rate at which the produced polymer is removed or extruded from the melt collecting zone. The control is achieved by nuclear radiation sensing of the liquid level of the produced polymer in the polymer holding reservoir and controlling the input of feed material into the reactor based on said level so as to achieve a substantially constant holding period of molten polymer prior to being extruded or spun into filaments.

BACKGROUND OF THE INVENTION

Figure 1:
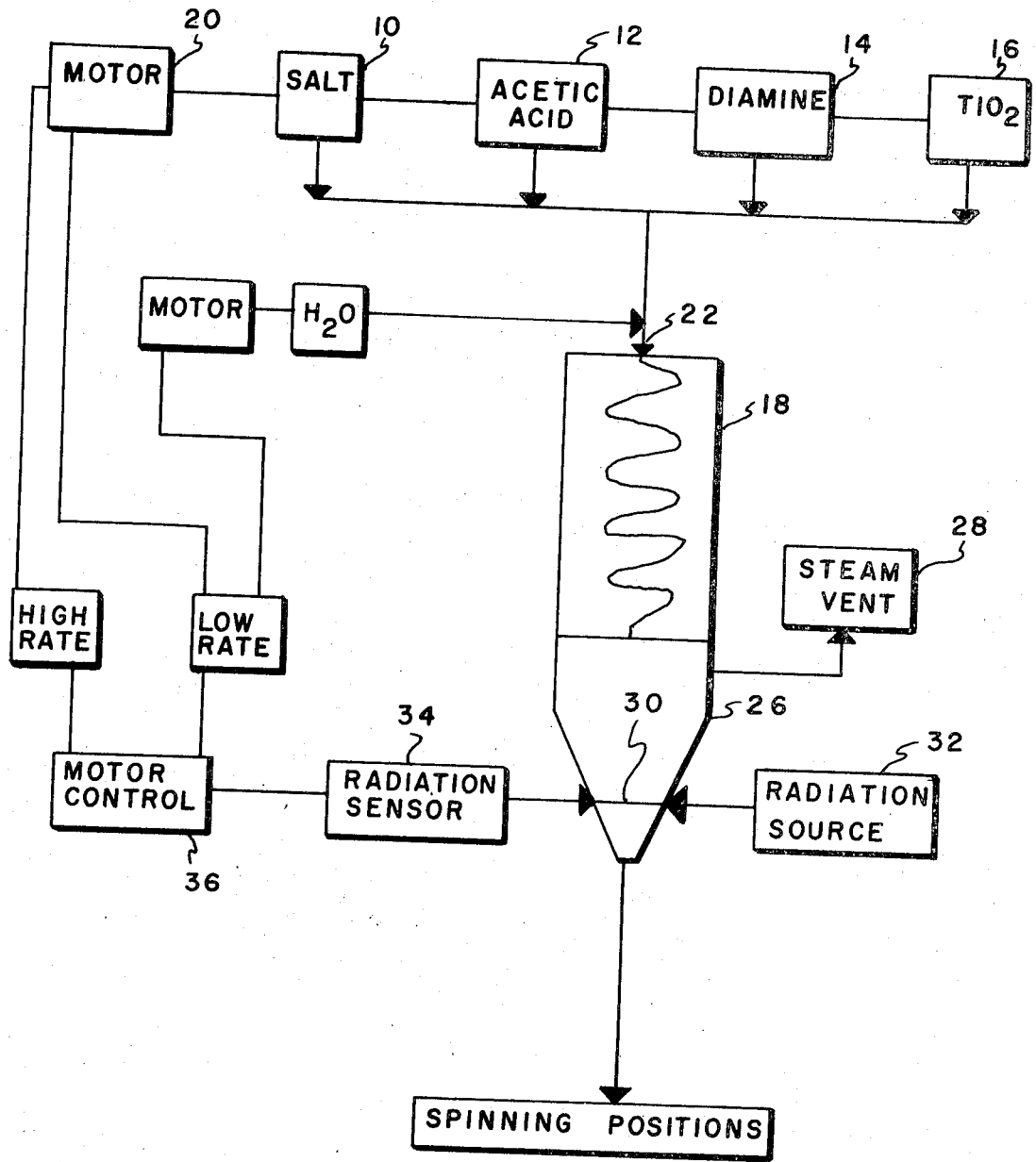

This invention, which is a continuation-in-part application of application Ser. No. 860,321, filed Sept. 23, 1969, now abandoned, relates to the continuous polymerization of polyamides and more particularly to the continuous polymerization of fiber forming and molding polyamides having substantially constant, long-term polymer characteristics, particularly amine end groups and relative viscosity. Such characteristics are required for subsequent dye uniformity and have been previously very difficult to contol under continuous polymerizations.

The continuous polymerization of polyamides is of relatively recent origin and has only very recently become a commercial reality. Reactors and processes for such continuous polymerization have been described by John A. Carter in U.S. Pat. 3,193,535 and other related patents. The process and apparatus described by Carter successfully produces fiber-forming polyamide. However, certain difficulties are encountered in commercial production utilizing such process and apparatus wherein a plurality of spinning columns are fed directly from the reactor. During the course of continuous operation, one or more of the spinning columns may be required to be shut down and/or certain variations in throughput occur thereby changing the rate at which the produced polymer is removed from the hold reservoir. Changes in the rate at which the polymer is removed from the reservoir reflect on the time interval to which the polymer is subjected to elevated temperatures, thereby effecting further polymerization and chemical changes in the polymer particularly as reflected in the number of amine end groups and relative viscosity. Further, even if the rate of removal of the polymer from the reservoir is held constant, it is extremely difficult to maintain a corresponding constant residence time in the reservoir without some periodic corrective feed or withdrawal action. In the spinning of fibers, the correction is best made by changes in the rate of feeding reactants, but such changes also result in changes in the resulting polymer properties because a slower throughput, such as occurs when the feed rate is reduced, results in a raising of the number of amine end groups.

It is therefore an object of the present invention to provide a method for controlling the number of amine end groups and relative viscosity of the polyamide in a continuous polyamide polymerization process, thereby obtaining a substantially uniform polymer as measured over short and long term polymerization. It is another object of the present invention to provide a control system and apparatus which controls the polymerization based on the sensing of the rate at which the polymer is being used. These and other objects will become apparent to those skilled in the art in the description of the invention which follows.

SUMMARY OF THE INVENTION

In accordance with the invention, a method is provided for operating a continuous polyamide polymerization process which comprises feeding reactant to a polymerization zone, polymerizing said reactants in said zone and collecting molten polymer in a holding zone, the improvement comprising controlling the level of molten polymer in said melt holding zone by passing a source of radiation through said melt holding zone, sensing the level of melt in said melt holding zone based on the passage of said radiation through said melt holding zone, regulating the input of reactants to said polymerization zone based on said sensing, said regulating being at least two distinct feed rates corresponding to a high feed rate and a lower feed rate, said high feed rate being initiated when a low level is sensed in said melt holding zone and said lower feed rate being initiated when a high level is sensed in said holding zone, said lower rate having substantially the same proportion of feed materials as said higher feed rate coupled with a proportional increase in the amount of water fed to said polymerization zone, thereby retaining a substantially constant rate of steam evolution in said polymerization zone.

The present invention is particularly significant in controlling the amine end group level within a very specific and desired narrow range, as is particularly desired for long-term continuous production of polyamide filaments on a day after day, week after week basis. Such control is effected even with changes in the rate at which the polymer is removed from the melt holding zone, which changes would normally cause fluctuations in the polymer characteristics. Even small rate changes so affect the amine end group level that non-uniform dyeing of the resulting product or non mergeability of the fibers is likely to occur.

It has been discovered that with decreasing rates of addition to the reactor, the amine end group (AEG) level increases, primarily because of decreased amine loss which limits the amount of diamine available for reaction with the dicarboxylic constituent. It has further been discovered that by adding water to replace at least part of the lesser volume of feed material to the polymerization zone, the AEG level can be decreased. Thus, the AEG level can be closely controlled at different feed rates by controlling the amount or proportion of water fed with the feed material. While applicant does not wish to be bound by the particular theory involved, it appears that with increased amounts of water, the larger volume of steam generated tends to increase the steam distillation of the diamine from the reaction prior to completing the reaction with the dicarboxylic reactant. Of course, it will be recognized that the additional amounts of water can be added by any of a number of ways, such as by changing the concentrations of any one or all of the reactant feed materials. Alternatively, the diamine concentration fed to the reactor can be correspondingly raised or lowered. However, it has been discovered that particularly good control is obtained utilizing a separate auxiliary feed of water to more conveniently supply the additional water.

DETAILS OF THE INVENTION

The invention will be more fully described by reference to the drawings in which:

FIG. 1 is a partial schematic and flow sheet illustrating the process of the present invention; and, FIG. 2 is a graph which illustrates recorded measurements of the meltpool level and the corresponding pump settings over a period of time.

Referring more particularly to the polymerization process involved herein, the process is directed to the production of polyamides by the polymerization of a polymethylene diammonium salt of an alpha, omega dicarboxylic acid, said salt containing 8 to 24 carbon atoms or an omega amino aliphatic carboxylic acid containing from 6 to 12 carbon atoms. The diammonium salt is the reaction product of a dicarboxy compound with a diamine compound. A typical example of this type is the production of polyhexamethylene adipamide, commonly referred to as nylon 6,6. In this instance, the dicarboxy acid is adipic acid and the diamine is hexamethylene diamine. The production of mixed polyamides such as by the copolymerization of an omega lactam and a polymethylene diammonium salt is also readily effected by the noted continuous polymerization process. The particular dicarboxylic acid used can be an aromatic or aliphatic and the diamine can be either an aromatic or aliphatic diamine.

Typical of the diammonium salts fed to the reactor are hexamethylene diammonium adipate, hexamethylene diammonium sebacate, octamethylene diammonium adipate, decamethylene diammonium adipate, pentamethylene diammonium sebacate, dodecamethylene diammonium adipate, omega-amino caproic acid, omega-amino undecanoic acid and the like. Such salts are fed to a polymerization zone in aqueous solution along with molecular weight controllers if desired, such as acetic acid and additional diamine, and, when delustered fibers are formed, delustrants such as $TiO_2$. Of course, other additives such as dye enhancers, heat stabilizers, brighteners and the like can also be added.

A suitable continuous polymerizer is described in the aforementioned Carter patent and is basically an elongated, tubular reactor composed of relatively lengthy sections of coiled tubing, which progressively or stepwise increase in internal diameter from the inlet of the polymerizer to the outlet section from which produced polymer exits. Because the reactants passed into the system contain solutioning amounts of water and water is normally a by-product of the condensation reaction, substantial volumes of steam are separated from the resulting polymer in the collecting zone or melt zone, also known as a meltpool.

The meltpool desirably has a specific and set residence time because, not only is this pool a holding area or reservoir for molten polymer, but further, equilibration of the polymer takes place therein because the polymer is under a lower pressure and removal of steam from contact with the polymer occurs therein. Thus, the relative viscosity (RV) tends to advance in the meltpool and the AEG level continues to drop. Therefore, the time of holding becomes an important factor in controlling the polymer properties. The polymer from the melt holding zone is preferably directly passed in molten form to a spinning position or extruded to form chips, pellets or the like, depending on the ultimate end use of the polymer. Of course, when the ultimate end use of the polymer is for fibers, it is desirable to directly spin the fiber, thereby eliminating a further reheating step.

Referring more particularly to the drawing, and particularly as exemplified for the production of nylon 6,6 textile filaments, hexamethylene diammonium adipate salt 10 in an aqueous solution, acetic acid for the control of the polymerization 12, diamine which, in the case of nylon 6,6 is hexamethylene diamine solution 14, and delustrant $TiO_2$ 16 is metered to reactor 18 in the desired predetermined proportions. Preferably, all of the metering is effected from a common power source, motor 20, which pumps the various feed materials in metered predetermined proportions to reactor 18.

Reactor 18 comprises a coiled, elongated, tubular configuration having an inlet 22 at which the feed materials are forced under superatmospheric pressure to the coil. The coil is heated to at least 10° above the melting point of the resulting polymer. For the production of nylon 6,6, a temperature of 285 to 290° C. is normally preferred. The heating is effected by surrounding the coil with a hot, uniformly heated fluid such as Dowtherm, which is a mixture of diphenyloxides, or the like heating source. The superatmospheric pressure is created by the rapid volatilization of the water in the fed solutions coupled with the coil internal diameter and length which supplies resistance to sustain the initial pressure. The entrance pressures are at least 14 atmospheres absolute and preferably in the range of 20 to 35 atmospheres absolute. The initial pressure decreases along the longitudinal length of the tube so as to achieve about atmospheric pressure or even subatmospheric pressure at the exit of the coil 24. Reactants and liberated steam in contact with each other are separated on exiting from the coil into meltpool 26. Meltpool 26 is maintained above the melting point of the resulting polymer and serves to collect molten polymer in the bottom thereby while venting steam through steam vent 28.

The particular level 30 of molten polymer maintained during polymerization, in effect, represents a certain predetermined hold time to effect the desired amount of equilibration and predetermined final adjustment of AEG level and relative viscosity. The desired level can be readily determined for the particular polymer and once set, it should be uniformly maintained to obtain a consistently uniform polymer. For fiber-forming purposes, a relative viscosity in the range of 25 to 70 or more is normally used with an RV of 35 to 65 being more preferred. Relative viscsoity is defined as the ratio of the viscosity of an 8.4% solution of polymer in 90% aqueous formic acid to the viscosity of the 90% aqueous formic acid at the same temperature, which measurements are normally at 25° C. The meltpool level is maintained at a predetermined level based on the desired hold time, which normally is in the range of 5 to 30 minutes or more. The variation, e.g. the standard deviation from the mean is controlled as closely as needed or desired for the particular process. The particular limits of variation, e.g. the standard deviation from predetermined level is controlled to the desired specificity by controlling the pumping rates to the reactor and the amount of and frequency of said rate changes as initiated by the radiation sensor as set forth hereinafter.

The level in the meltpool is constantly sensed by a radiation source 32, which transmits ionizing energy through the meltpool to radiation receiver or sensor 34, which senses the change in reception of such energy, thereby sensing the level of polymer in the meltpool 26. The ionizing energy can be from any of a number of suitable sources, for example, radioactive material, X-ray tubes, ultraviolet light and the like. Preferably, the ionizing source is radioactive material which provides a beta and/or gamma radiation. Such radioactive sources can be placed outside of the meltpool container and travels through the vessel and is received on the other side thereof. As such, any source of gamma radiation can be used, such as cesium 137, strontium 90 and the like elements, whose radioactive half-life is sufficiently long to warrant practical use. Suitable radiation sensors are commercially available from the Ohmart Corporation.

While is should be understood that the maximum intensity of the radiation source is only limited by safety requirements, a particularly suitable radiation source has been found to be a 300 millicurie cesium 137 source. Such a source has been found to deliever from 2.0 to 3.2 milliroentgens per hour at the receiving means on the side of the meltpool container opposite the radiation source. A preferred receiver or sensing device for purposes of this invention is an ionization chamber having the ability to convert radioactive energy directly into electrical energy. The ionization chamber contains two electrodes which have different work functions. These electrodes are separated by a filling gas. When the filling gas is ionized by exposure to nuclear radiation, positive ions are attracted to the electronegative electrode and negative ions are attracted to the electropositive electrode; thus, an electrical current is generated. The generated current is measured by a high input impedance amplifier having a zero to 100 scale. A high stability, variable current source of opposite polarity to that of the ionization chamber is used to calibrate the instrument at 50 when the meltpool level is at the ideal level. Such operation allows the use of a radiation source of any practical intensity. A reading above 50 indicates a high level in the meltpool and causes an eddy current coupling to drive the low speed unit of the polymer feed pump. A reading below 50 indicates a low level in the meltpool and causes an eddy current coupling to actuate the high speed unit of the polymer feed pump.

Based on the sensing of the polymer level 30, radiation sensor 34 signals motor control 36 to initiate a high rate of pumping or a low rate of pumping, depending upon the level sensed. When a low level is sensed, a high pumping rate is initiated and when a high level in the meltpool is sensed, a low pumping rate is initiated. The differential between the pumping rates can be relatively large or narrow, depending on the degree of level control desired in the meltpool. Finer variations in the pumping speeds will result in finer tunings and smaller standard deviation of the level in the meltpool. Of course, rather than having a merely high or low rate, a variable rate can be achieved, but for most purposes, it has been found desirable to have two set pumping rates which produce a feed rate difference of about 0.1 to 10% by weight of the solids in the aqueous solutions.

When the low rate is initiated, the concentration of reactants continues to be the same, but at a slower rate, coupled with an additional amount of water. Therefore, the change in volume of feed is less than the change in the solids fed. The amount of water pumped into the reactor at the low rate is preferably not directly equivalent to the difference between the water volume at high rate and the water volume at low rate. By adding an amount of water equal to the difference in water at the higher rate minus the water at the lower rate, too much diamine is volatilized from the reactants prior to reacting therewith, thus overly depressing the amine end group level of the resulting polymer. While an equal amount of compensating water maintains an equal initial polymerization pressure, too little compensating water results in a reduced initial polymerization pressure which further upsets the reaction. Thus, it has been found more preferable to supply approximately 40 to 95% and more preferably, 50 to 80% of the amount of water in the differential between the two feed rates.

This water can be added by changing the concentration of one of the reactants so as to supply one reactant in a more diluted aqueous solution or by changing the amount of diamine added to the reaction so as to compensate for the diffeerence in reaction mechanisms at the different feed rates. However, the desired result has been found to be most readily and more simply accomplished by merely adding the specified additional amount of water. Therefore, at the low pumping rate, a separate water feed is initiated to compensate for the change in reaction thereby achieving the same AEG level in the resulting polymer.

The invention will be more clearly illustrated by reference to the following example, which describes a particularly preferred embodiment. In the example, unless otherwise indicated, all parts are by weight.

EXAMPLE

Nylon 6,6 polymer was produced in a continuous polymerizer constructed in accordance with the aforementioned Carter patent. The particular continuous reactor was composed of two tubular sections of different diameter, the smaller diameter being at the inlet end. The tubular reactor was jacketed with heated Dowtherm maintained at 285° C. The process was set up in accordance with FIG. 1 wherein hexamethylene diammonium adipate salt in a 47% aqueous concentration, hexamethylene diamine in a 50% aqueous concentration, acetic acid in a 5% aqueous concentration and $TiO_2$ delustrant as a 10% aqueous concentration were the feed materials to the polymerizer. The feed ingredients were in proportions predetermined to produce a semi-dull nylon 6,6 fiber.

Two pumping rates for the reactants were present at motor speed of 1500 ±5 revolutions per minute (r.p.m.), which represented the high pumping rate and a lower pumping rate of 1448 ±5 r.p.m.'s. The higher pumping rate metered 669 parts per hour of salt, 7.7 parts per hour of hexamethylene diamine, 2.6 parts per hour of acetic acid solution and 8.1 parts per hour of $TiO_2$ slurry to the polymerizer. The lower pumping rate fed 647 parts per hour of salt solution, 7.4 parts per hour of hexamethylene diamine solution, 2.5 parts per hour of acetic acid solution, 7.9 parts per hour of $TiO_2$ solution and 9.9 parts per hour of water to the polymerizer.

A 300-millicurie nuclear radiation source of cesium 137 which produces gamma radiation, was positioned on the exterior of the meltpool to direct radiation through the meltpool at a level which represented a predetermined polymer hold time. The radiation receiver sensed the meltpool level of produced polymer being continuously fed from the reactor into the meltpool based on the intensity of radiation received.

FIG. 2 traces the pumping rate initiated by the radiation sensor as it was automatically recorded during the continuous polymerization process. The meltpool level was also automatically recorded during the polymerization.

Analytical data checking the uniformity of the polymer indicated that the AEG level was controlled at 44.5 ±1, which variation is approximately within the limits of present AEG tests. The relative viscosity was also controlled at 39 ±1, which degree of control is also approximately within the limits of the relative viscosity test. The meltpool level trace indicated that the average residence time of polymer in the meltpool was being controlled within ±5%.

Polymer from the reactor was manifolded to spinnerets for direct melt spinning into 70/34 semi-dull nylon 6,6 yarn containing 0.3% $TiO_2$. In five weeks of continuous operation, no yarn was downgraded because of failure in the control of AEG level or relative viscosity.

The process described in the example is operated utilizing different concentrations of aqueous feed material to compensate for the addition of water fed to the reactor at the low pumping level to obtain correspondingly good results. Also, the change in pumping rates between the high level and low level can be made in stepwise fashion or with smaller degrees of change, thereby controlling the meltpool residence time within narrower limits.

Further, and in the same manner, other polyamide condensation polymers are produced including mixed polyamides, at higher and lower RV's and AEG levels as may be desired with correspondingly good results.

These and other changes in the mode of operation can be effected by those skilled in the art without departing from the spirit of the invention, as has been made apparent from the present disclosure.

What is claimed is:

1. In a continuous process for polycarbonamide polymerization comprising feeding polycarbonamide forming aliphatic reactants to a polymerization zone polymerizing said aliphatic reactants in said zone and collecting molten fiber forming polymer in a holding zone, the improvement comprising controlling the level of molten fiber forming polymer in said melt holding zone by passing radiation from a constant source through said melt holding zone, sensing the level of melt in said melt holding zone based on the passage of said radiation through said melt holding zone, regulating the input of reactants to said polymerization zone based on said sensing, said regulating being accomplished by the use of at least two distinct feed rates corresponding to a high feed rate, and a lower feed rate, the differential between the two feed rates being about 0.1 to 10% by weight of the non-aqueous components in the aqueous feed solution, said high feed rate being initiated when a low level is sensed in said melt holding zone and said lower feed rate being initiated when a high level is sensed in said holding zone, said lower rate having substantially the same portion of feed materials as said higher feed rate coupled with a proportional increase in the amount of water fed to said polymerization zone, thereby retaining a substantially constant rate of steam evolution in said polymerization zone.

2. The process of claim 1 wherein the aliphatic reactants are fed to the polymerization zone as aqueous solutions or dispersants.

3. The process of claim 1 wherein the increased amount of water added to said polymerization zone at said low feed rate is fed as a separate source of water.

4. The process of claim 1 wherein the increased amount of water added to said polymerization zone at said low feed rate is fed as a different aqueous concentration of one of the fed materials.

5. The process of claim 1 wherein the amount of additional water fed to the polymerization zone at the lower feed rate is an amount which compensates for 40 to 95 percent of the amount of water in the differential between the two feed rates.

6. The process of claim 1 wherein the radiation sensing is based on the transmission of gamma radiation from a radioactive source.

7. The process of claim 6 wherein the radioactive source is cesium 137.

8. The process of claim 1 wherein the aliphatic reactants are hexamethylene diammonium adipate and hexamethylene diamine.

References Cited

UNITED STATES PATENTS

| | | | |
|---|---|---|---|
| 3,357,955 | 12/1967 | Bryan | 260—78 R |
| 3,476,713 | 11/1969 | Dorsey | 260—78 R |
| 3,503,937 | 3/1970 | Allen et al. | 260—78 R |

HAROLD D. ANDERSON, Primary Examiner

U.S. Cl. X.R.

250—43.5 D, 43.5 FL; 260—37 N, 95 A